Patented Sept. 8, 1931

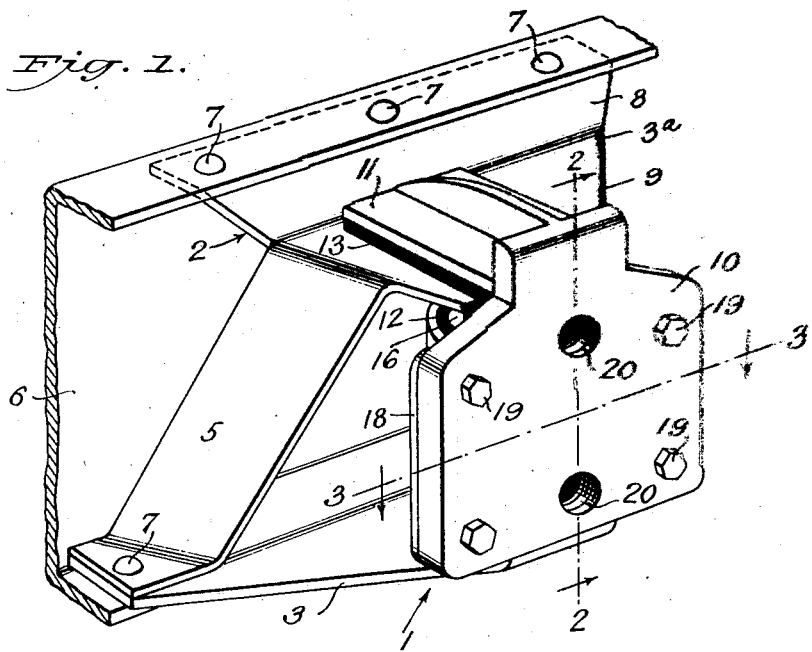

1,822,529

UNITED STATES PATENT OFFICE

WALTER C. KEYS, OF DETROIT, MICHIGAN, ASSIGNOR TO THE MECHANICAL RUBBER COMPANY, OF CLEVELAND, OHIO, A CORPORATION OF NEW JERSEY

MOUNTING BRACKET

Application filed September 6, 1928. Serial No. 304,350.

This invention relates to a supporting bracket, more particularly to a bracket adapted to support an automobile engine in a frame.

The problem of supporting an automobile engine in a frame involves, in addition to supplying a sufficiently strong connection between the frame and engine, a supporting bracket which will absorb high frequency vibrations arising from the engine and which will also dampen shocks and twisting stresses arising from the motion of the automobile over uneven roads and from rapid acceleration and deceleration.

It is the object of this invention to provide an improved form of bracket which is so constructed that it will not only support the engine but also absorb the high frequency vibrations and the shocks and twisting stresses above alluded to.

The device disclosed herein is but one modification of the invention, another modification being disclosed and claimed in application Sr. No. 304,349, filed of even date herewith.

A preferred form of the invention is hereinafter particularly described and shown in the accompanying drawings in which:

Fig. 1 is a perspective view of a bracket in position on the side rail of the automobile frame.

Fig. 2 is a section on line 2—2 of Fig. 1.

Fig. 3 is a section on line 3—3 of Fig. 1.

The bracket is indicated by the numeral 1, as shown in Fig. 1, and has a supporting sheet metal stamping or member 2 consisting of a bottom plate 3, top plate 3a, and a web 4 extending between the top and bottom plates, as shown in Fig. 2. A pair of reinforcing struts 5 extend from the middle portion of the upper plate 3a to the inner portion of the lower plate 3 as shown in Figs. 1 and 2. The inner ends of the plates 3 and 3a are fastened by means of rivets 7 to the channel shaped side rail 6 of the car frame. The top plate 3a has an inclined portion 8 and a horizontal portion 9 the purpose of which will later appear.

The bracket 1 also has a supported plate 10 provided with a horizontal extension 11 adapted to extend over and in juxtaposition to the horizontal portion 9 of the top plate 3a. The vertical portion of plate 10 is adapted to be placed in juxtaposition to the vertical web of the stamping 2.

A sheet of vulcanized rubber compound 12 or other cushioning material such as rubberized fabric or a rubber compound having fibrous ingredients is positioned between the stamping 2 and the plate 10. A tab 13 of this rubber sheet 12 extends between the horizontal portions 9 and 11 of the stamping and plate. As shown in Fig. 3, the rubber sheet 12 also has its sides 14 extending around and in back of the web 4. In order to provide for a larger surface of contact between the rubber and the metal a metal insert 15 having flanges 16 fits around the web 14. A U-shaped piece or stamping 17 carried by the plate 10 and forming therewith a second member extends in back of the web 4 and holds the plate 10, the rubber sheet 12, the web 4, and the insert 15 together in one unit. The U-shaped stamping 17 has the flanges 18 juxtaposed to the plate 10, and bolts 19 which extend through suitable apertures in plate 10 and flanges 18 serve to connect the stamping 17 and the plate 10 in one unit, and thus provide a portion substantially in the form of a sleeve surrounding the web 4. The plate 10 has threaded apertures 20 which receive bolts that serve to secure the plate 10 to the engine, as shown in dotted lines in Fig. 2.

As will appear from the above detailed description and inspection of the drawings, it will be seen that the bracket herein disclosed provides a strong support between the frame of the car and the engine. The width of the plates 3a and 3 at their points of connection with the side rails 6 is such as to provide adequate resistance to twisting about a vertical axis. The distance between the points of connection of the top plate 3 and the bottom plate 3a together with the struts 5 provides the necessary strength against any twisting about any horizontal axis. The horizontal portions 9 and 11 of the stampings 2 and plate 10 respectively provide for the support of the engine. The depth of the U-shaped stamping 17 is such that the elements clamped thereby are held only under a tension sufficient to prevent any looseness or free movement between the stamping 2 and the plate 10, that is the rubber sheet 12 is under no more than a slight compression and the term "substantially unstressed" as used in the claims is intended to convey that idea.

While the correctness of the following theory is not known to a certainty, it is to the best of my knowledge believed to be an accurate statement of the operation of the device. Since the high frequency vibrations are thought to be due to the rapid reciprocatory and rotary motions of the engine parts, such vibrations are thought to occur in a vertical plane and are transmitted by the metal of the engine to the bracket. The plate 10 transmits vertical vibrations through its extension 11 to the horizontal portion 13 of the rubber sheet due to the intimate contact between the metal and the rubber since the weight of the motor places the rubber in the tab 13 under compression which provides the intimate contact between the metal and rubber. However, due to the fact that vibrations are not readily transmitted from a medium having a low coefficient of elasticity to one having a high coefficient of elasticity, it is believed that the vibrations transmitted to the rubber sheet are absorbed therein and not transmitted to the stamping 2.

Due to the motion of the automobile over uneven roads and due to the rapid acceleration and deceleration, especially with present day four wheel brakes, the inertia of the motor causes stresses and twisting in a horizontal plane. These stresses and twistings are dampened and the harmful effects thereby lessened due to the fact that the vertical portion of the rubber sheet is substantially unstressed so that a certain amount of "give" or "play" is present between the stamping 2 and the plate 10, which permits slight movement between the engine and frame which is resisted by a gradually increasing restoring force provided by the rubber so that the force of the shock is transmitted gradually.

While the above theory is thought to be correct, other theories may be advanced to explain the results obtained by the bracket. However, the results of absorbing high frequency vibrations and dampening shocks and twisting stresses is obtained regardless of theory.

While a preferred modification of the invention has been disclosed herein, it is not intended thereby to limit the invention thereto but as will be apparent to those skilled in the art many changes in the size and form of the parts of the device may be made within the scope of the invention, and for an understanding of the scope of the invention reference should be made to the claims.

Having thus described my invention, what I claim and desire to protect by Letters Patent is:

1. A bracket for supporting an engine in a frame comprising in combination a member adapted to be fastened to the frame and having a vertical web and a horizontal face, a second member adapted to be fastened to the engine and having a sleeve surrounding the web and a horizontal face associated with the horizontal face of the first mentioned member, and cushioning material between the horizontal faces and between the web and the sleeve.

2. A bracket for supporting an engine in a frame comprising in combination a member adapted to be fastened to the frame and having a vertical web and a horizontal face, a second member adapted to be fastened to the engine and having a sleeve surrounding the web and a horizontal face associated with the horizontal face of the first mentioned member, and cushioning material between the horizontal faces and between the web and the sleeve, the horizontal portion of the cushioning material normally being under compression, the vertical portion of the cushioning material normally being substantially unstressed.

3. In combination, a member to be fastened to a frame and having a vertical web, a second member adapted to be fastened to the engine and having a vertical face justaposed to the web, a U-shaped piece carried by the vertical face of the first named member and forming therewith a sleeve, and cushioning material interposed between the sleeve and the web.

4. A sheet metal stamping adapted to be fastened to a frame and having a vertical web, a member adapted to be fastened to a supported device and having a vertical face juxtaposed to the web, a U-shaped sheet metal stamping fastened to the vertical face of said member and bridging the web to form a sleeve therearound, and cushioning material interposed between the sleeve and the web, said first named stamping and said member having cooperating horizontal faces, and cushioning material between said faces.

5. A supporting bracket comprising a member having a vertical web and laterally extending plates adapted for connection to a frame on each end of the vertical web, a second member having a sleeve surrounding the vertical web and a laterally extending portion overlying a laterally extending plate of the first member, and cushioning material between the sleeve and the vertical web and between the extending portion and the laterally extending plate.

Signed at Detroit, county of Wayne, State of Michigan, this 30th day of June, 1928.

WALTER C. KEYS.